United States Patent
Maruyama et al.

(10) Patent No.: US 8,897,368 B2
(45) Date of Patent: Nov. 25, 2014

(54) IMAGE CODING DEVICE, IMAGE CODING METHOD, IMAGE CODING INTEGRATED CIRCUIT AND IMAGE CODING PROGRAM

(71) Applicant: Panasonic Corporation, Osaka (JP)

(72) Inventors: Yuki Maruyama, Osaka (JP); Tatsuro Juri, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/054,940

(22) Filed: Oct. 16, 2013

(65) Prior Publication Data
US 2014/0044186 A1 Feb. 13, 2014

Related U.S. Application Data

(62) Division of application No. 12/864,605, filed as application No. PCT/JP2008/003239 on Nov. 7, 2008, now abandoned.

(30) Foreign Application Priority Data

Jan. 29, 2008 (JP) ................................. 2008-017759

(51) Int. Cl.
*H04N 7/12* (2006.01)
*H04N 19/583* (2014.01)
*H04N 19/51* (2014.01)
*H04N 19/139* (2014.01)
*H04N 19/105* (2014.01)
*H04N 19/176* (2014.01)
*H04N 19/61* (2014.01)
*H04N 19/46* (2014.01)

(52) U.S. Cl.
CPC ... *H04N 19/00727* (2013.01); *H04N 19/00715* (2013.01); *H04N 19/00151* (2013.01); *H04N 19/00024* (2013.01); *H04N 19/00278* (2013.01); *H04N 19/00781* (2013.01); *H04N 19/00545* (2013.01)
USPC ...................................... 375/240.16

(58) Field of Classification Search
CPC ........................... H04N 7/50; H04N 19/00727
USPC ...................................... 375/240.16
See application file for complete search history.

(56) References Cited

U.S. PATENT DOCUMENTS 6,782,052 B2 * 8/2004 Sun et al. ................ 375/240.12
8,401,080 B2    3/2013 Kondo et al.
(Continued)

FOREIGN PATENT DOCUMENTS

JP        8-23515      1/1996
JP      2001-145011    5/2001
(Continued)

OTHER PUBLICATIONS

International Search Report issued Dec. 2, 2008 in International (PCT) Application No. PCT/2008/003239.
(Continued)

*Primary Examiner* — Sath V Perungavoor
*Assistant Examiner* — James Pontius
(74) *Attorney, Agent, or Firm* — Wenderoth, Lind & Ponack, L.L.P.

(57) ABSTRACT

An image coding device which codes input image data includes a coding flag generation unit which determines whether or not the input image data is image data included in data of a moving picture showing a motion of a predetermined motion amount or greater, and generates coding flag information which indicates a result of the determination. A coding method determination unit determines a coding method in which the input image data references coded image data that the coded image data indicates is the input image data included in the data of the moving picture that is closer to the input image data. An image coding unit compression-codes the input image data using the coding method determined by the coding method determination unit.

3 Claims, 13 Drawing Sheets

(56) References Cited

U.S. PATENT DOCUMENTS

| | | | |
|---|---|---|---|
| 8,687,694 B2 | 4/2014 | Wahadaniah et al. | |
| 8,767,829 B2* | 7/2014 | Demos | 375/240.15 |
| 2002/0131498 A1* | 9/2002 | Sun et al. | 375/240.12 |
| 2003/0202594 A1 | 10/2003 | Lainema | |
| 2008/0063065 A1* | 3/2008 | Lin | 375/240.16 |
| 2008/0063288 A1 | 3/2008 | Abe et al. | |
| 2010/0002776 A1* | 1/2010 | Lee | 375/240.25 |
| 2010/0150240 A1 | 6/2010 | Wahadaniah et al. | |
| 2011/0064141 A1* | 3/2011 | Wang et al. | 375/240.25 |
| 2013/0051456 A1* | 2/2013 | Kitahara et al. | 375/240.02 |

FOREIGN PATENT DOCUMENTS

| | | |
|---|---|---|
| JP | 2002-77924 | 3/2002 |
| JP | 2004-221744 | 8/2004 |
| JP | 2006-94454 | 4/2006 |
| JP | 2008-11117 | 1/2008 |
| WO | 2007/040197 | 4/2007 |

OTHER PUBLICATIONS

ITU-T Recommendation H.264 (Mar. 2005), "Advanced video coding for generic audiovisual services", pp. i-xiv and 1-324.

* cited by examiner (a) Coding method for normal case (flag-OFF case)

(b) Coding method for flag-ON case (a) Coding method for normal case (flag-OFF case)

(b) Coding method for flag-ON case

Coding method for flag-ON case (a) Coding method for normal case (flag-OFF case)

(b) Coding method for flag-ON case

IMAGE CODING DEVICE, IMAGE CODING METHOD, IMAGE CODING INTEGRATED CIRCUIT AND IMAGE CODING PROGRAM

BACKGROUND OF THE INVENTION

1. Technical Field

The present invention relates to image coding devices and image coding methods which compression-code images and records resulting coded image data on a storage medium such as an optical disc, a magnetic disk, and a flash memory. In particular, the present invention relates to image coding devices, image coding methods, image coding integrated circuits, and image coding programs which compression-code images using an H.264 compression coding method.

2. Background Art

Along with advancement of digital video technology, techniques for compressing digital moving picture data have been developed to treat an increasing amount of data. Such development can be seen in the form of compression techniques specifically designed for moving picture data by taking advantage of characteristics of moving picture data.

In addition, increased processing power of information processing apparatuses such as computers has made possible complex computations involved in compression techniques, resulting in a significant increase in compression rate of moving picture data.

For example, a compression technique employed in satellite and terrestrial digital high-definition broadcasting is a compression method referred to as the Moving Picture Experts Group 2 (MPEG-2). For example, for satellite digital high-definition broadcasting, moving picture data is compressed to approximately one-thirtieth of the original using the MPEG-2.

The MPEG-4 AVC/H.264 compression standard, which is one of moving picture data compression-coding methods standardized after MPEG-2, is said to achieve a compression rate approximately twice higher than that of the MPEG-2.

The MPEG-4 AVC/H.264 is employed also as a moving picture data compression method for Blu-ray, which is a standard of optical discs, and for Advanced Video Codec High Definition (AVCHD), which is a standard for recording high-definition moving picture using a video camera. This shows expectations for wide application of the MPEG-4 AVC/H.264.

However, the MPEG-4 AVC/H.264 involves a significantly increased computation amount compared to MPEG-2, because the MPEG-4 AVC/H.264 achieves a high compression rate by implementing combinations of many compression techniques as disclosed in Non-Patent Reference 1.

Such techniques for compressing moving picture data include motion compensation. In coding video through motion compensation, first a motion vector to predict a motion amount is searched for, and then the motion vector obtained by the searching is used for the motion compensation.

Generally, accuracy of estimation of a motion vector is improved by searching a larger range for a motion vector. However, searching a larger range increases the computation amount, thus resulting in higher power consumption. The range searched for a motion vector is thus often determined by considering computation amount or circuit scale.

When a motion vector is searched for within a limited range, the range is not always set to be large enough for motion of an input image.

For example, the range searched for a motion vector is not large enough in the case where an input image is included in a moving picture captured by zooming or panning of a camera or in the case where images preceding and following the input image shows a significantly large motion. This has problematically reduced accuracy of estimation of a motion vector, resulting in lower image quality and lower coding efficiency.

Patent Reference 1 discloses a method for solving such a problem. In the method, coding efficiency is improved by changing methods of predicting motion compensation depending on.

Non-Patent Reference 1: ITU-T Recommendation H.264
Patent Reference 1: Japanese Unexamined Patent Application Publication No. 2001-145011

SUMMARY OF INVENTION

However, in the method disclosed in Patent Reference 1, only the methods of predicting motion compensation are changed depending the state of zoom of a camera and the range of searching for a motion vector is not changed.

This does not always provide a range which is large enough for searching for a motion vector, possibly resulting in lower accuracy of estimation of a motion vector.

Particularly in the case where a current picture to be coded and a reference picture are temporally distant from each other (for example, two or more frames away), a range large enough for searching for a motion vector is large in comparison with the case where a current picture to be coded and a reference picture are temporally close (for example, one frame away or closer). Accuracy of estimation of a motion vector thus further decreases.

The present invention, conceived to solve the problem, has an object of providing an image coding device, an image coding method, an image coding integrated circuit, and an image coding program which reduce computation amount for image coding, speed up image coding, and lower power consumption while enhancing image quality and coding efficiency.

In order to achieve the object, the image coding device according to the present invention codes input image data and includes: a coding flag generation unit configured to determine whether or not the input image data is image data included in data of a moving picture which shows a motion of a predetermined motion amount or greater, and generate coding flag information which indicates a result of the determination; a coding method determination unit configured to determine such a coding method in which the input image data references coded image data that the coded image data in the case where the coding flag information generated by the coding flag generation unit indicates that the input image data is image data included in data of a moving picture which shows a motion of the predetermined motion amount or greater is closer to the input image data in input order than in the case where the coding flag information generated by the coding flag generation unit does not indicate that the input image data is image data included in data of a moving picture which shows a motion of the predetermined motion amount or greater; and an image coding unit configured to compression-code the input image data using the coding method determined by the coding method determination unit.

The coding flag generation unit may be configured to determine that the input image data is included in data of a moving picture which shows a motion of the predetermined motion amount or greater, when the coding flag generation unit receives information indicating that the input image data is included in data of a moving picture captured by zooming or panning of a camera.

The coding flag generation unit may be configured to determine that the input image data which is currently to be coded is included in data of a moving picture which shows a motion of the predetermined motion amount or greater, in the case where a feature amount calculated from a difference between the input image data which is currently to be coded and preceding input image data is equal to or above a predetermined threshold.

The image coding unit may be configured to compression-code, on a per macroblock basis, respective pictures including a current picture to be coded which is the input image data, and in the case where a feature amount is equal to or above a predetermined threshold, the coding flag generation unit may be configured to determine that the input image data which is currently to be coded is included in data of a moving picture which shows a motion of the predetermined motion amount or greater, the feature amount being a value calculated from motion vectors used for the compression-coding performed by the image coding unit on the per macroblock basis before the compression-coding of the current picture.

The image coding unit may be configured to select B-picture as a picture type of a current picture in the compression-coding of the current picture, the current picture being the input image data, and in the case where the coding flag information indicates that the current picture is image data included in data of a moving picture which shows a motion of the predetermined motion amount or greater, the coding method determination unit may be configured to determine the coding method such that the current picture references only one or more pictures temporally preceding the current picture when the current picture belongs to a frame temporally next following the a P-picture in input order and is to be coded as a B-picture.

The image coding unit may be configured to select B-picture as a picture type of a current picture in the compression-coding of the current picture, the current picture being the input image data, and in the case where the coding flag information indicates that the current picture is image data included in data of a moving picture which shows a motion of the predetermined motion amount or greater, the coding method determination unit may be configured to determine the coding method such that the current picture references only one or more pictures temporally following the current picture when the current picture belongs to a frame temporally next preceding a P-picture in input order and is to be coded as a B-picture.

The image coding unit may be configured to select B-picture as a picture type of the input image data in the compression-coding of the input image data, and in the case where the coding flag information indicates that the input image data is image data included in data of a moving picture which shows a motion of the predetermined motion amount or greater, the coding method determination unit may be configured to determine the coding method such that the number of successive frames to be coded as B-pictures by said image coding unit is smaller than in the case where the coding flag information does not indicate that the input image data is image data included in data of a moving picture which shows a motion of the predetermined motion amount or greater.

Furthermore, the image coding method according to the present invention is a method of coding input image data and includes: determining whether or not the input image data is image data included in data of a moving picture which shows a motion of the predetermined motion amount or greater; generating coding flag information which indicates a result of the determination; determining such a coding method in which the input image data references coded image data that the coded image data in the case where the coding flag information generated in the generating indicates that the input image data is image data included in data of a moving picture which shows a motion of the predetermined motion amount or greater is closer to the input image data in input order than in the case where the coding flag information generated in the generating does not indicate that the input image data is image data included in data of a moving picture which shows a motion of the predetermined motion amount or greater; and compression-coding the input image data using the coding method determined in the determining of a coding method.

Furthermore, the image coding integrated circuit according to the present invention codes input image data and includes: a coding flag generation unit configured to determine whether or not the input image data is image data included in data of a moving picture which shows a motion of a predetermined motion amount or greater, and generate coding flag information which indicates a result of the determination; a coding method determination unit configured to determine such a coding method in which the input image data references coded image data that the coded image data in the case where the coding flag information generated by the coding flag generation unit indicates that the input image data is image data included in data of a moving picture which shows a motion of the predetermined motion amount or greater is closer to the input image data in input order than in the case where the coding flag information generated by the coding flag generation unit does not indicate that the input image data is image data included in data of a moving picture which shows a motion of the predetermined motion amount or greater; and an image coding unit configured to compression-code the input image data using the coding method determined by the coding method determination unit.

Furthermore, the image coding program for coding input image data causes a computer to execute: determining whether or not the input image data is image data included in data of a moving picture which shows a motion of a predetermined motion amount or greater; generating coding flag information which indicates a result of the determination; determining such a coding method in which the input image data references coded image data that the coded image data in the case where the coding flag information generated in said generating indicates that the input image data is image data included in data of a moving picture which shows a motion of the predetermined motion amount or greater is closer to the input image data in input order than in the case where the coding flag information generated in said generating does not indicate that the input image data is image data included in data of a moving picture which shows a motion of the predetermined motion amount or greater; and compression-coding the input image data using the coding method determined in said determining of a coding method.

According to the present invention, when input image data is image data included in a moving picture showing a motion of a predetermined motion amount or greater, the input image data, that is, a current picture to be coded references a picture temporally close to the current picture.

This increases accuracy of estimation of a motion vector in searching for the motion vector, thus increasing coding efficiency for the input image data included in the data of the moving picture showing a large motion.

For example, coding efficiency is increased for coding of a moving picture captured by zooming or panning of a camera.

Furthermore, such image coding devices require a small amount of operations and a small circuit scale in comparison with the method in which coding efficiency is increased by searching a larger range for a motion vector. The present

NUMERICAL REFERENCES

Figure 1:
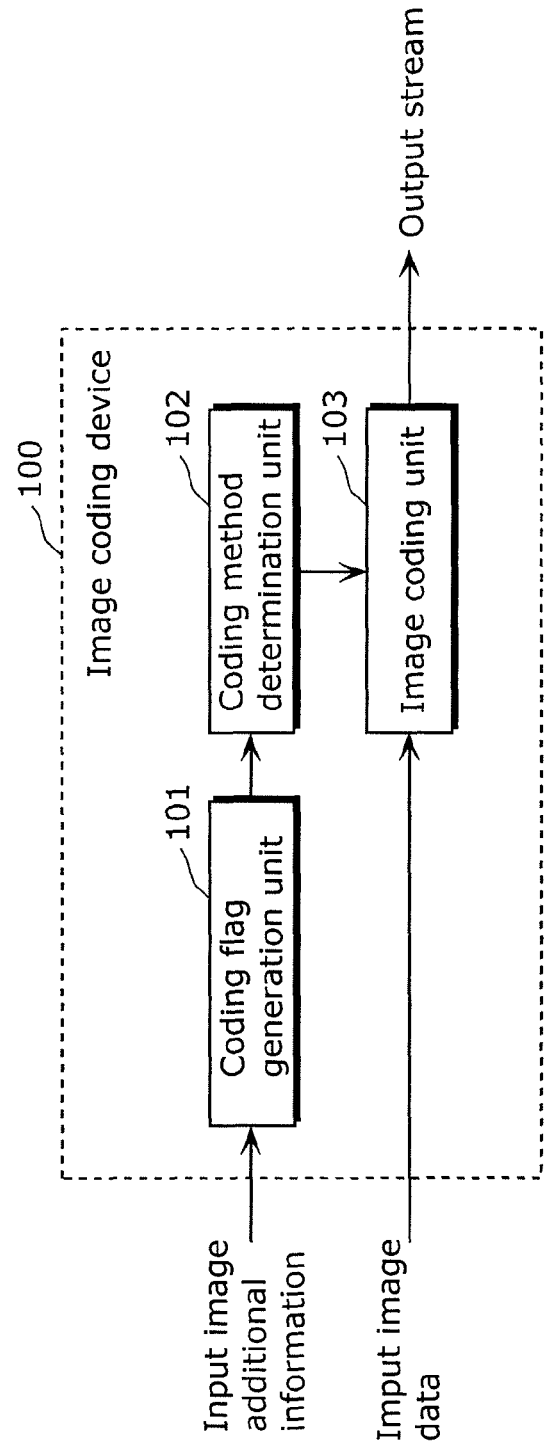
FIG. 1 is a block diagram which illustrates an image coding device according to Embodiment 1 of the present invention.

100, 800, 900 Image coding device
101, 801, 901 Coding flag generation unit
102 Coding method determination unit
103 Image coding unit
200 Image coding integrated circuit
201 Input image data memory
202 Reference image data memory
203 Intra picture prediction unit
204 Motion vector estimation unit
205 Motion compensation unit
206 Prediction mode determination unit
207 Difference calculation unit
208 Orthogonal transformation unit
209 Quantization unit
210 Inverse quantization unit
211 Inverse orthogonal transformation unit
212 Adder
213 Entropy coding unit

DETAILED DESCRIPTION OF THE INVENTION

The following describes embodiments of the present invention with reference to drawings.

Embodiment 1

FIG. 1 is a block diagram which illustrates an image coding device 100 according to Embodiment 1 of the present invention. The image coding device 100 according to Embodiment 1 of the present invention receives input image data and input image additional information, which is additional information on the input image data. The image coding device 100 codes the input image data using an H.264 compression method and outputs the coded input image data as a stream.

In coding using the H.264 compression method, one picture is divided into one or more slices, and each of the slices is treated as a unit of processing.

In coding using the H.264 compression method according to Embodiment 1 of the present invention, one picture is treated as one slice.

Each picture to be coded by the image coding device 100 is an example of input image data to be coded by an image coding device, an image coding method, an image coding integrated circuit, and an image coding program according to the present invention.

The word "picture" means either "frame picture", in which two fields (a top field and a bottom field) are treated as one frame, or "field picture", in which two pictures are treated as two individual pictures.

Since the image coding device 100 uses the H.264 compression method as a coding method, coding of an interlace signal, for example, may be performed per frame or per field selectively for each picture.

These matters relating to the H.264 and pictures described above apply also to Embodiments 2 and 3 of the present invention described later.

As shown in FIG. 1, the image coding device 100 includes a coding flag generation unit 101, a coding method determination unit 102, and an image coding unit 103.

In Embodiment 1 of the present invention, the coding flag generation unit 101 receives input image additional information, which is additional information on the input image data. The coding flag generation unit 101 then generates coding flag information based on the input image additional information and transmits the coding flag information to the coding method determination unit 102.

The input image additional information indicates, for example, whether or not a video camera which provides image data to the image coding device 100 is zooming, or whether or not the video camera is panning.

In other words, the input image additional information indicates whether or not the input image data is included in data of a moving picture showing a large motion, such as a moving picture captured by zooming or panning of a camera.

The input image additional information is additional information on the input image data and provided to the image coding device 100 along with the input image data.

The "pan" is used in the present description to mean "tilt" which is a technique in which a video camera is moved up or down in capturing a moving picture.

The image coding device 100 may be incorporated in a video camera. Alternatively, the image coding device 100 may be a device separate from a video camera and connected to the video camera over a wire or wirelessly. These configurations apply also to Embodiments 2 and 3 described later.

The coding method determination unit 102 is a processing unit which determines a coding method to be used in the image coding unit 103. More specifically, the coding method determination unit 102 determines, based on the coding flag information generated by the coding flag generation unit 101, a coding method in which information is indicated such as a picture type of a current picture in coding and a picture referenced by the current picture. The coding method determination unit 102 further transmits the determined information to the image coding unit 103 as determined coding method information.

Specific operation of the coding method determination unit 102 will be described later in detail.

The image coding unit 103 compression-codes image data of a current picture according to the determined coding method information provided from the coding method determination unit 102 using an H.264 compression method.

Figure 2:
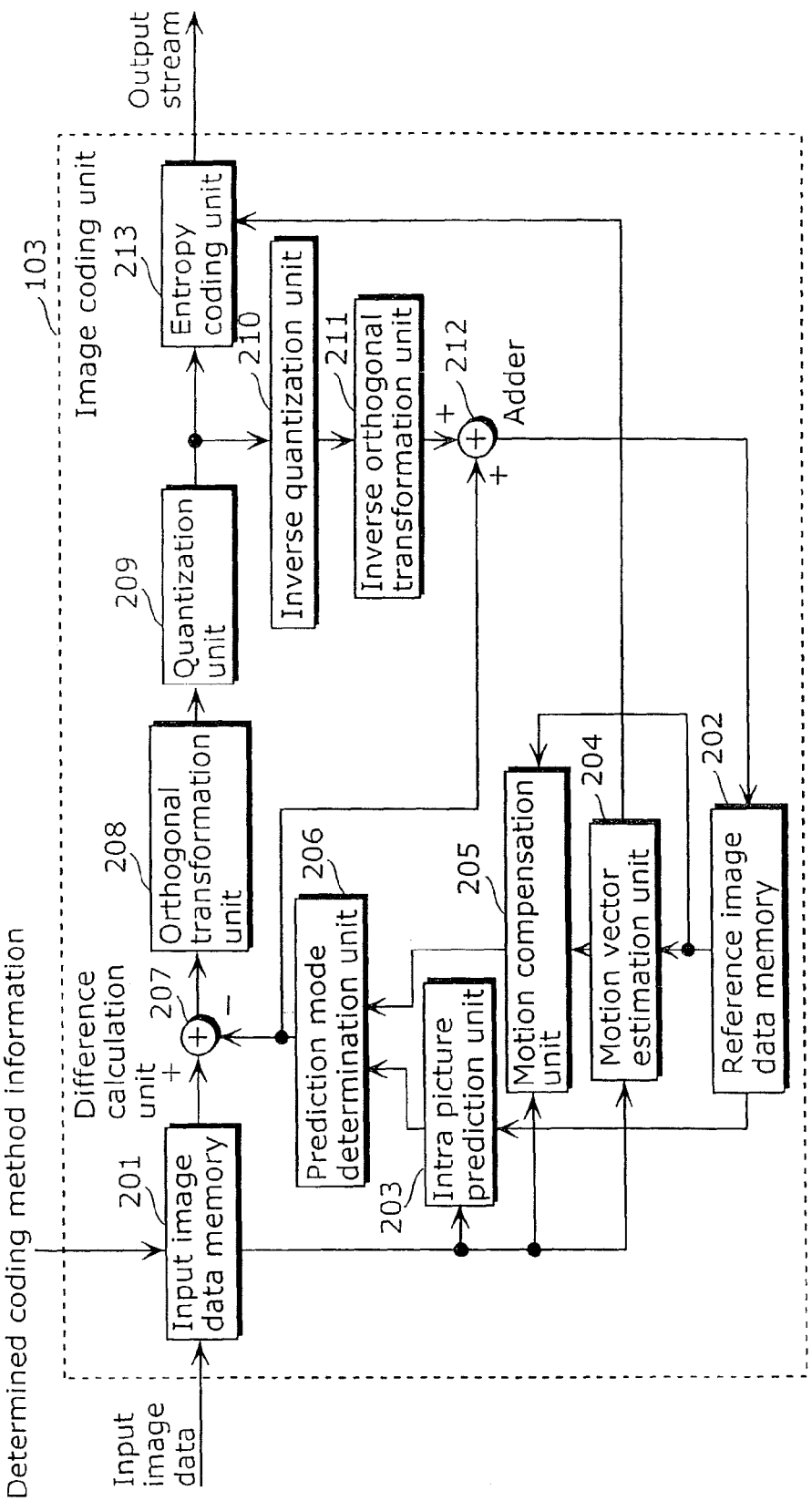
FIG. 2 is a block diagram which illustrates a configuration of the image coding unit of the image coding device according to Embodiment 1 of the present invention.

The following describes a detailed configuration of the image coding unit 103 with reference to FIG. 2.

FIG. 2 is a block diagram which illustrates a configuration of the image coding unit 103 of the image coding device 100 according to Embodiment 1 of the present invention.

As shown in FIG. 2, the image coding unit 103 includes an input image data memory 201, a reference image data memory 202, an intra picture prediction unit 203, a motion vector estimation unit 204, a motion compensation unit 205, a prediction mode determination unit 206, a difference calculation unit 207, an orthogonal transformation unit 208, a quantization unit 209, an inverse quantization unit 210, an inverse orthogonal transformation unit 211, an adder 212, and an entropy coding unit 213.

The input image data memory 201 stores input image data and determined coding method information which corresponds to input image data transmitted from the coding method determination unit 102. In other words, the input image data memory 201 holds current input image data and determined coding method information which corresponds to the current input image data.

The information held in the input image data memory 201 is referred to by the intra picture prediction unit 203, the motion vector estimation unit 204, the motion compensation unit 205, and the difference calculation unit 207.

The motion vector estimation unit 204 searches locally decoded images stored in the reference image data memory 202 for an image area which most closely resembles the input image to determine a motion vector which indicates the position of the image area. In addition, the motion vector estimation unit 204 determines a size of a current block to cause the smallest error and a motion vector for the size, and transmits information on the size and the motion vector to the motion compensation unit 205 and the entropy coding unit 213.

Using the motion vector indicated in the information transmitted from the motion vector estimation unit 204, the motion compensation unit 205 picks up, from the locally decoded images stored in the reference image data memory 202, an image area which best matches a predictive image. The motion compensation unit 205 then generates a predictive image through inter picture prediction and provides the generated predictive image to the prediction mode determination unit 206.

The intra picture prediction unit 203 performs intra picture prediction using coded pixels included in an image among the locally decoded images stored in the reference image data memory 202, and generates a predictive image through the intra picture prediction. The intra picture prediction unit 203 then transmits the generated predictive image to the prediction mode determination unit 206.

The prediction mode determination unit 206 determines a prediction mode. Based on the determination, the prediction mode determination unit 206 then selects a predictive image from the predictive image generated through the intra picture prediction and provided from the intra picture prediction unit 203 and the predictive image generated through the inter picture prediction and provided from the motion compensation unit 205, and then outputs the selected one.

The prediction mode determination unit 206 determines a prediction mode using a method, for example, in which the prediction mode determination unit 206 obtains, for each of the predictive images generated through the inter picture prediction and the intra picture prediction, a sum of absolute differences (SAD) between each pixel in the input image and the corresponding pixel in the predictive image.

The difference calculation unit 207 obtains the input image data from the input image data memory 201 and calculates a pixel difference value between the obtained input image and the corresponding predictive image provided from the prediction mode determination unit 206. The difference calculation unit 207 then provides the calculated pixel difference value to the orthogonal transformation unit 208.

The orthogonal transformation unit 208 transforms the pixel difference value provided from the difference calculation unit 207 into a frequency coefficient and transmits the frequency coefficient to the quantization unit 209.

The quantization unit 209 quantizes the frequency coefficient provided from the orthogonal transformation unit 208 and provides the resulting value, that is, a quantization index to the entropy coding unit 213 and the inverse quantization unit 210 as data to be coded.

The inverse quantization unit 210 inverse-quantizes the quantization index provided from the quantization unit 209 to restore the frequency coefficient and provides the restored frequency coefficient to the inverse orthogonal transformation unit 211.

The inverse orthogonal transformation unit 211 performs inverse frequency transformation on the frequency coefficient provided from the inverse quantization unit 210 into the pixel difference value and provides the pixel difference value to the adder 212.

The adder 212 adds the pixel difference value provided from the inverse orthogonal transformation unit 211 and the predictive image provided from the prediction mode determination unit 206 to generate a locally decoded image. The adder 212 then provides the locally decoded image to the reference image data memory 202.

Here, the locally decoded image stored in the reference image data memory 202 is generally the same as the input image stored in the input image data memory 201.

However, the locally decoded image contains the result of a series of processes performed on the pixel difference value, including the orthogonal transformation performed by the orthogonal transformation unit 208, the quantization performed by the quantization unit 209, the inverse quantization performed by the inverse quantization unit 210, and the inverse orthogonal transformation performed by the inverse orthogonal transformation unit 211. The locally decoded image thus includes distortion components such as a quantization distortion.

The entropy coding unit 213 performs entropy-coding on the quantization index provided from the quantization unit 209, the motion vector provided from the motion vector estimation unit 204, and the like, and outputs resulting coded data as an output stream.

The following describes processing performed by the image coding device 100.

First, input image data is provided to the image coding unit 103, and input image additional information is provided to the coding flag generation unit 101.

The input image data is stored in the input image data memory 201 of the image coding unit 103. The input image data is made up of 1920×1080 pixels, for example.

The input image additional information includes additional information on the input image data, such as information indicating whether or not the input image data is data of an image captured by zooming of a camera.

The coding flag generation unit 101 determines whether or not the input image data is image data included in a moving picture showing a motion of a predetermined motion amount or greater, and then generates coding flag information which indicates the result of the determination.

In Embodiment 1 of the present invention, the coding flag generation unit 101 refers to the input image additional information in order to make the determination as to whether or not the input image data is image data included in data of a moving picture showing a motion of a predetermined motion amount or greater.

As a result, when determining that the input image data is image data included in data of a moving picture showing a motion of the predetermined motion amount or greater, the coding flag generation unit 101 generates coding flag information which indicates ON. Otherwise, the coding flag generation unit 101 generates coding flag information which indicates OFF.

The coding flag generation unit 101 then provides the generated coding flag information to the coding method determination unit 102.

In this case, the input image additional information indicates whether or not the input image data is data of an image captured by zooming of a camera, that is, whether or not the input image data is included in data of a moving picture captured by zooming or panning of a camera. The input image additional information having such content is provided from, for example, a zoom button of a video camera to the coding flag generation unit 101.

In another case, the input image additional information indicates, for example, whether or not the input image data is included in data of a moving picture captured by zooming or panning of a camera. The input image additional information having such content is provided from, for example, an acceleration sensor of a video camera to the coding flag generation unit 101.

Figure 3:
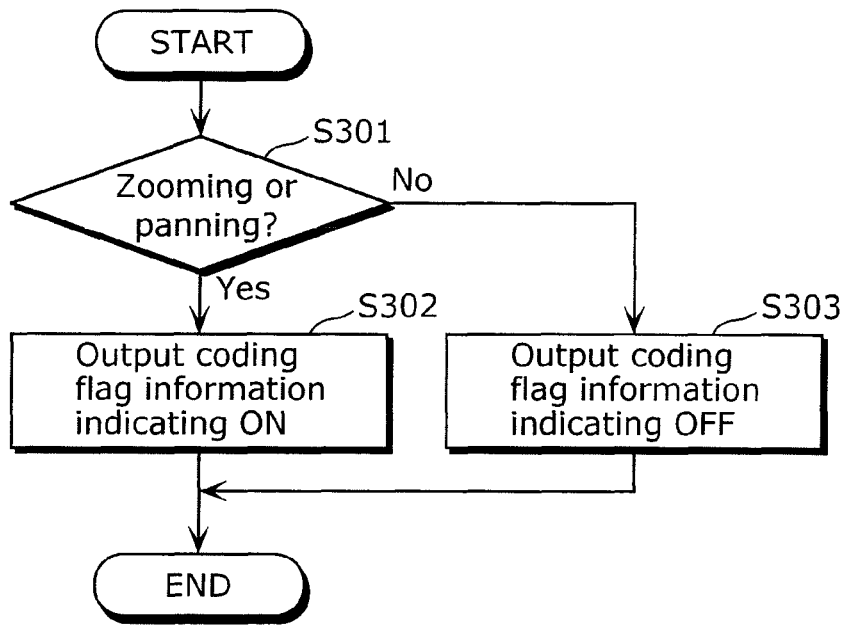
FIG. 3 is a flowchart which illustrates an example of processing performed by the coding flag generation unit of the image coding device according to Embodiment 1 of the present invention.

The following describes an example of processing performed by the coding flag generation unit 101 with reference to FIG. 3.

FIG. 3 is a flowchart which illustrates an example of processing performed by the coding flag generation unit 101 of the image coding device 100 according to Embodiment 1 of the present invention.

As shown in FIG. 3, the coding flag generation unit 101 determines whether or not input image data is data of an image captured by zooming of a camera (S301). When determining in S301 that the input image data is data of an image captured by zooming of a camera (Yes in S301), the coding flag generation unit 101 generates coding flag information which indicates ON, and provides the coding flag information to the coding method determination unit 102 (S302).

When determining in S301 that the input image data is data of an image captured by zooming of a camera (No in S301), the coding flag generation unit 101 generates coding flag information which indicates OFF, and provides the coding flag information to the coding method determination unit 102 (S303).

It is to be noted that FIG. 3 illustrates the case where the image coding device 100 obtains information, as input image additional information, indicating whether or not the input image data is included in data of a moving picture captured by zooming of a camera.

Furthermore, the coding flag generation unit 101 performs the same processing in the case where input image additional information indicates whether or not the input image data is included in data of a moving picture captured by panning of a camera. More specifically, the coding flag generation unit 101 generates coding flag information which indicates ON when input image additional information indicates the input image data is included in data of a moving picture captured by panning a camera. Otherwise, the coding flag generation unit 101 generates the coding flag information which indicates OFF.

Figure 4:
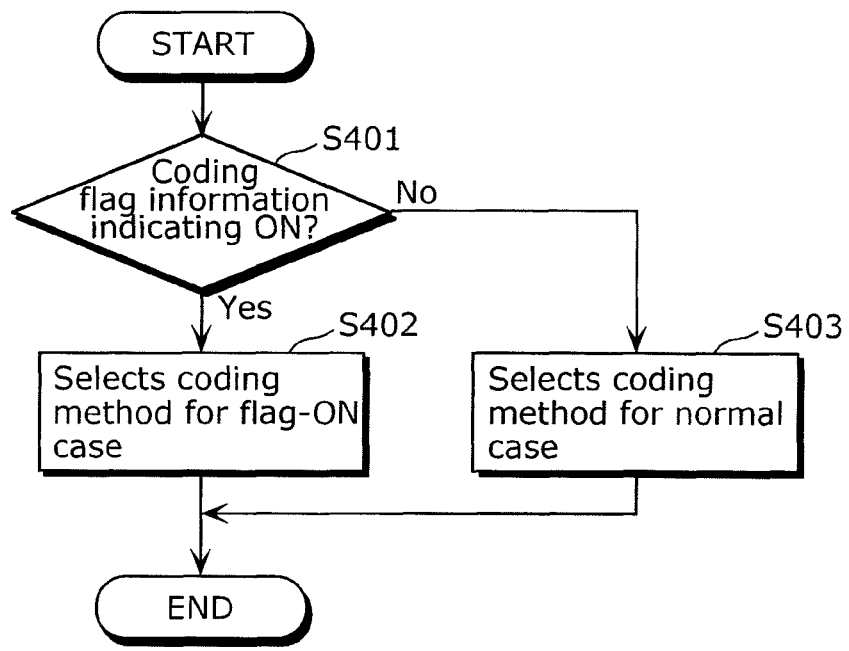
FIG. 4 is a flowchart which illustrates an example of processing performed by a coding method determination unit of the image coding device according to Embodiment 1 of the present invention.

The following describes an example of the processing performed by the coding method determination unit 102 with reference to FIG. 4.

FIG. 4 is a flowchart which illustrates an example of processing performed by the coding method determination unit 102 of the image coding device 100 according to Embodiment 1 of the present invention.

The coding method determination unit 102 determines, based on the coding flag information generated by the coding flag generation unit 101, a coding method in which information is indicated such as a picture type of a current picture in coding and a picture referenced by the current picture, and then generates determined coding method information. The coding method determination unit 102 then transmits the generated determined coding method information to the image coding unit 103.

In FIG. 4, the coding method determination unit 102 determines whether or not the coding flag information provided from the coding flag generation unit 101 indicates ON (S401). When determining in S401 that the coding flag information indicates ON (Yes in S401), the coding method determination unit 102 selects a coding method for the coding flag information indicating ON (hereinafter also referred to as a "flag-ON case") (S402).

When determining in S401 that the coding flag information indicates OFF (No in S401), the coding method determination unit 102 selects a coding method for a normal case, that is, a coding method for the coding flag information indicating OFF (hereinafter also referred to as a "flag-OFF case") (S403).

The coding methods for the flag-ON case and the normal case (the flag-OFF case) are described later in detail. Briefly, the coding method determination unit 102 determines a coding method such that, in coding of a current picture, a picture referenced when the coding flag information indicates ON is temporally closer to the current picture in input order than a picture referenced when the coding flag information indicates OFF is.

The image coding unit 103 performs a series of coding processes such as motion vector estimation, motion compensation, intra picture prediction, orthogonal transformation, quantization, and entropy coding, based on the determined coding method information determined by the coding method determination unit 102.

It is to be noted that Embodiment 1 of the present invention assumes that the image coding unit 103 codes input image data in accordance with an H.264 coding method. Embodiments 2 and 3 of the present invention described below also assume this.

In Embodiment 1, the image coding device 100 thus determines coding flag information which indicates whether or not the input image data is included in data of a moving picture which shows a motion of a predetermined motion amount or greater according to additional information on the input image data.

In addition, the image coding device 100 determines a coding method such that a picture to be referenced when the coding flag information indicates ON is temporally closer to the current picture to be coded than or as close to the current picture to be coded as a picture to be referenced when the coding flag information indicates OFF is.

In other words, the image coding device 100 references a picture temporally closer to the current picture so as to code a current picture when the coding flag information indicates ON.

The image coding device 100 thus enhances accuracy of estimation of a motion vector in searching for a motion vector. Consequently, coding efficiency of input image data included in data of a moving picture showing a large motion is increased.

Furthermore, the image coding device 100 requires a small amount of operations and a small circuit scale in comparison with the method in which coding efficiency is increased by searching a larger range for a motion vector. The image coding device 100 thus achieves higher image quality and higher coding efficiency through a smaller amount of operations and smaller power consumption at a higher speed for an image coding method.

Figure 5:
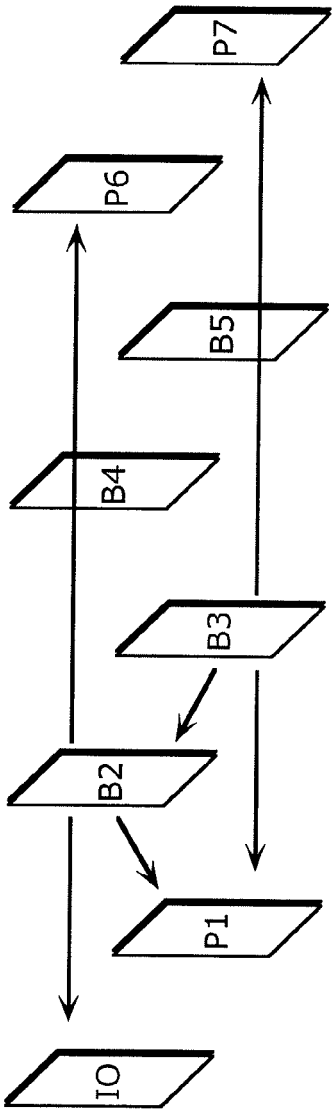
FIG. 5 illustrates an example of a first method in which the coding method determination unit of the image coding device according to Embodiment 1 of the present invention determines a coding method. (a) illustrates a coding method for a normal case, and (b) for a flag-ON case.
Figure 5:
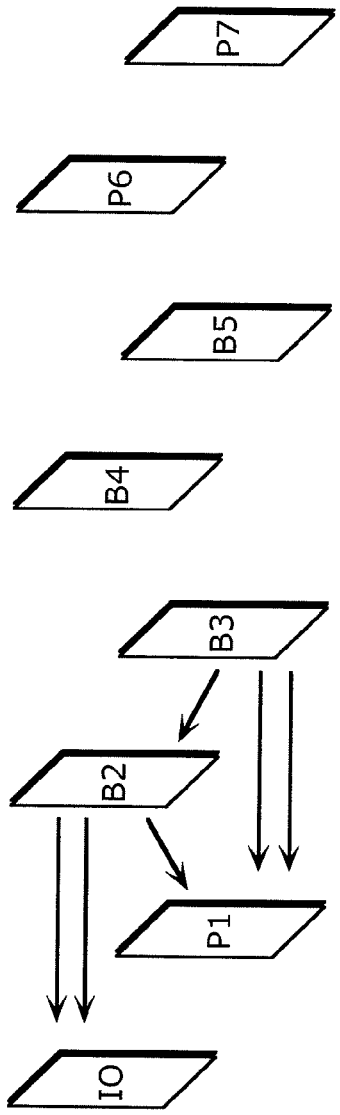
Figure 6:
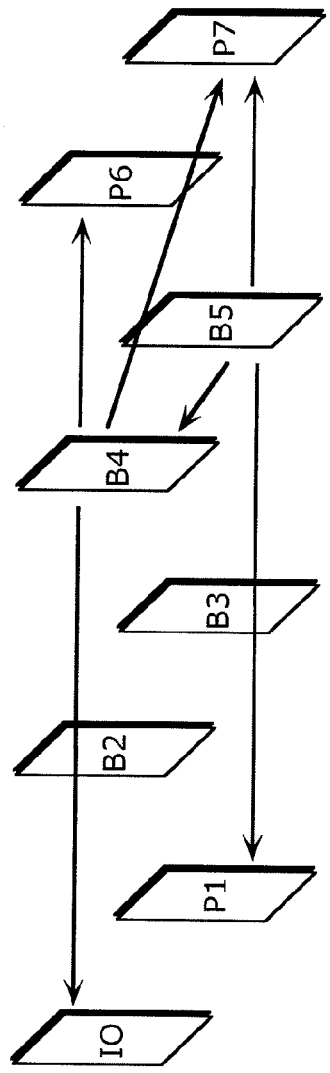
FIG. 6 illustrates another example of the first method in which the coding method determination unit of the image coding device according to Embodiment 1 of the present invention determines a coding method. (a) illustrates a coding method for a normal case, and (b) for a flag-ON case.
Figure 6:
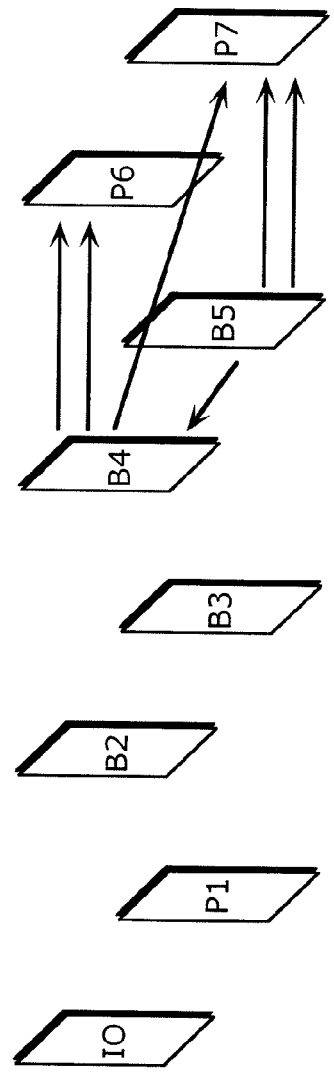
Figure 7:
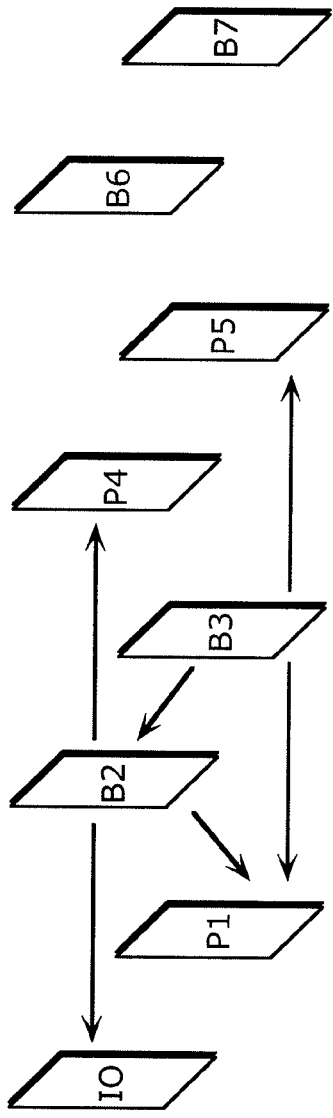
FIG. 7 illustrates an example of a second method in which the coding method determination unit of the image coding device according to Embodiment 1 of the present invention determines a coding method.

The following describes processing which the coding method determination unit 102 performs to determine a coding method with reference to FIG. 5, FIG. 6, and FIG. 7.

(a) and (b) of FIG. 5 illustrate an example of a first method in which the coding method determination unit 102 of the image coding device 100 according to Embodiment 1 of the present invention determines a coding method.

(a) and (b) of FIG. 6 illustrate another example of the first method in which the coding method determination unit 102 of the image coding device 100 according to Embodiment 1 of the present invention determines a coding method.

FIG. 7 illustrates an example of a second method in which the coding method determination unit 102 of the image coding device 100 according to Embodiment 1 of the present invention determines a coding method.

Firstly, the following describes the first method of determining a coding method with reference to (a) and (b) of FIG. 5.

(a) of FIG. 5 specifically illustrates a coding method for a normal case (a coding method for the flag-OFF case) in the case where the current picture is to be coded as a B-picture and belongs to a frame temporally next following a P-picture.

(b) of FIG. 5 specifically illustrates a coding method for the flag-ON case in the case where the current picture is to be coded as a B-picture.

In (a) and (b) of FIG. 5, a picture I0 is coded as an I-picture, a picture P1, a picture P6, and a picture P7 are each coded as a P-picture, and a picture B2, a picture B3, a picture B4, and a picture B5 are each coded as a B-picture.

These pictures are arranged in input order into the image coding device 100. That is, they have been input into the image coding device 100 in order of I0, P1, B2, and B3.

This shows that the temporal distance between B2 and B3 is shorter than the temporal distance between B2 and B4. The input order of the pictures is the same as the order of reproduction of the pictures.

For example, B2 and B3 are pictures belonging to a frame next preceding P1 which is a P-picture.

Each of the pictures I0 to P7 is a field picture. The pictures in the upper rows such as I0 and B2 are top filed pictures, and the pictures in the lower rows such as P1 and B3 are bottom field pictures. That is, (a) and (b) of FIG. 5 illustrates a coding method for the case where the image coding device 100 codes an interlace signal.

Figure 8:
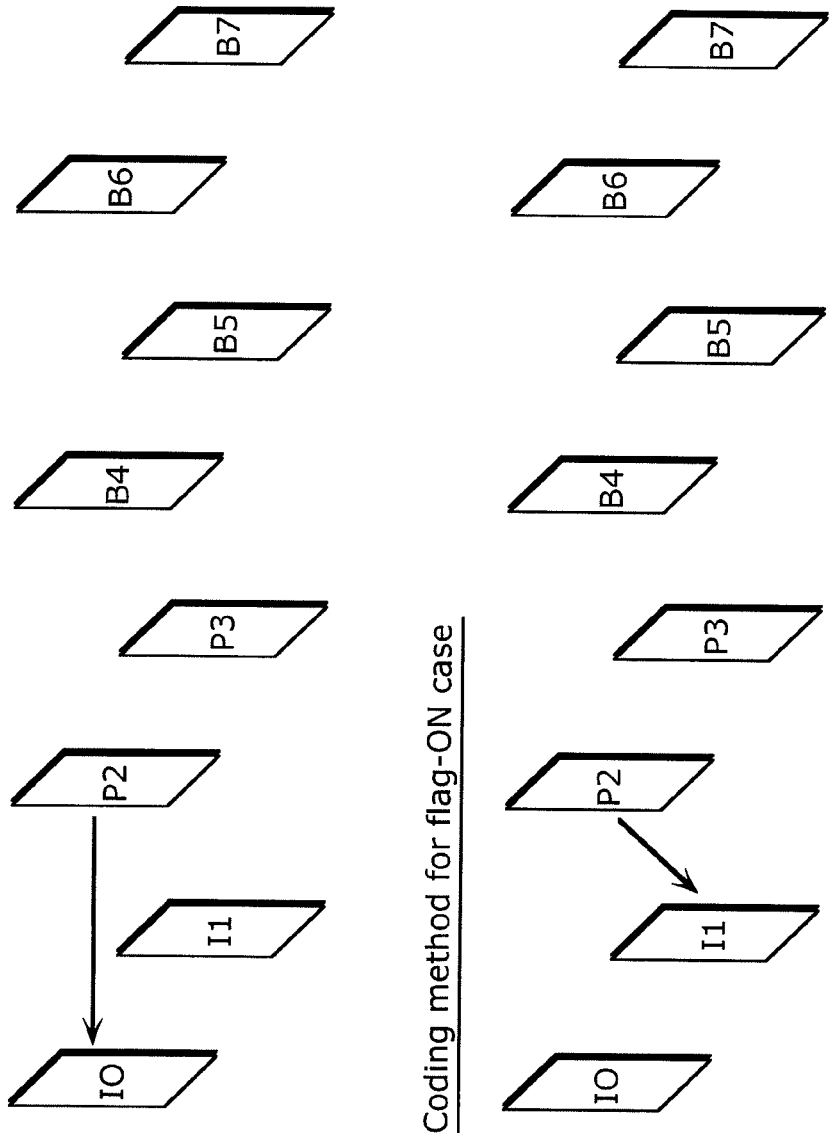
FIG. 8 illustrates a method of coding a current picture as a P-picture. (a) illustrates a coding method for a normal case, and (b) for a flag-ON case.

These matters relating to pictures described above apply also to FIG. 6 (a) to FIG. 8 (b).

The arrows in the drawings represent that the picture at the pointed end of each of the arrows (destination) is referenced in coding of the picture at the other end of the arrow (origin).

"B-picture" means a picture obtained through bidirectional prediction coding, "P-picture" means a picture obtained through unidirectional prediction coding, and "I-picture" means a picture obtained through intra picture prediction.

In the case where a current picture belongs to a frame temporally next following a P-picture and is to be coded as a B-picture (in (a) of FIG. 5, the pictures B2 and B3 are current pictures to be coded), the coding method determination unit 102 determines, as a coding method for a normal case, a coding method in which the pictures I0, P1, and P6 are selected as reference pictures of the picture B2, as illustrated in (a) of FIG. 5.

The coding method determination unit 102 also determines a coding method in which pictures B2, P1, and P7 are selected as reference pictures of the picture B3.

Here, the temporal distances between the pictures B2 and P6 and between the pictures B3 and P7 are longer than the distances between the current pictures and the other reference pictures.

In this case, the range searched for a motion vector cannot be large enough for coding of input image data for which the coding flag information indicates ON, that is, input image data of a moving picture showing a large motion. As a result, accuracy of estimation of a motion vector for the input image data is reduced.

In order to solve this problem caused when the coding flag information indicates ON, the coding method determination unit 102 determines a coding method for the flag-ON case as illustrated in (b) of FIG. 5. The coding method determination unit 102 determines a coding method in which pictures I0 and P1 are selected as reference pictures of the picture B2 and the pictures B2 and P1 are selected as reference pictures of the picture B3.

That is, in the case where the coding flag information indicates ON, the coding method determination unit 102 determines a coding method such that a current picture references only one or more pictures temporally preceding the current picture when the current picture belongs to a frame temporally next following a P-picture and is to be coded as a B-picture.

By selecting reference pictures in this manner, the current pictures to be coded reference temporally close pictures when the coding flag information indicates ON for the current picture to be coded. This increases accuracy of estimation of a motion vector in searching for a motion vector. The image coding device 100 according to Embodiment 1 thus achieves higher accuracy of estimation of a motion vector in searching for a motion vector without searching a larger range for the motion vector, and thereby increasing image quality and coding efficiency.

Alternatively, when coding is performed in the coding method for the flag-ON case, the number of reference pictures may be reduced from three, as selected in the coding method for a normal case, to two. For example, only the pictures I0 and P1 are selected as reference pictures for B2 and one range of each of the reference pictures is set as a range to be searched for a motion vector.

In this case, as the number of the ranges to be searched for motion vectors decreases to two, the amount of data processing necessary for searching for motion vectors decreases to two-thirds in comparison with the normal coding method.

Thus, in the image coding device 100 implemented as an integrated circuit or a specific circuit, the number of cycles necessary for searching for motion vectors in coding using a coding method for a flag-ON case is two-thirds of the number of cycles necessary for coding using a coding method for a normal case.

Alternatively, if the number of ranges to be searched for motion vectors is kept the same as in Embodiment 1 of the present invention, the one-third of the number of cycles to spare may be effectively used.

For example, the coding method determination unit 102 selects the picture I0 as a reference picture of the picture B2 as illustrated in (b) of FIG. 5, and sets a center of a range to be searched different from the center of the range to be searched determined in the coding method for a normal case.

In other words, the coding method determination unit 102 determines a coding method such that the picture I0 has two ranges to be searched for motion vectors.

Similarly, the coding method determination unit 102 determines a coding method in which the picture P1 is selected as a reference picture of the picture B3 in (b) of FIG. 5 so that the picture B3 has two ranges to be searched for motion vectors.

The number of cycles predetermined for hardware is thereby effectively used to the full. As a result, accuracy of motion estimation and coding efficiency are further increased.

Next, the following describes another example of the first method of determining a coding method with reference to (a) and (b) of FIG. 6.

(a) of FIG. 6 specifically illustrates a coding method for a normal case (a coding method for the flag-OFF case) in the case where the current picture is to be coded as a B-picture and belongs to a frame temporally next preceding a P-picture.

(b) of FIG. 6 specifically illustrates a coding for the flag-ON case in the case where the current picture is to be coded as a B-picture.

The arrows in the drawings represent the same as the arrows in (a) and (b) of FIG. 5.

In the case where a current picture belongs to a frame temporally next preceding a P-picture and is to be coded as a B-picture (in (a) of FIG. 6, the pictures B4 and B5 are current pictures to be coded), the coding method determination unit 102 determines, as the coding method for a normal case, a coding method in which the pictures I0, P6, and P7 are selected as reference pictures of the picture B4, and the pictures B4, P1, and P7 as reference pictures of the picture B5, as illustrated in (a) of FIG. 6.

Here, the temporal distances between the pictures B4 and I0 and between the pictures B5 and P1 are longer than the distances between the current pictures and the other reference pictures.

In this case, the range to be searched for a motion vector is not large enough for coding of input image data for which the coding flag information indicates ON, that is, input image data of a moving picture showing a large motion. As a result, accuracy of estimation of a motion vector for the input image data decreases.

In order to solve this problem caused when the coding flag information indicates ON, the coding method determination unit 102 determines a coding method for the flag-ON case illustrated in (b) of FIG. 6. As illustrated in (b) of FIG. 6, the coding method determination unit 102 determines a coding method in which pictures P6 and P7 are selected as reference pictures of the picture B4 and the pictures B4 and P7 are selected as reference pictures of the picture B5

That is, in the case where the coding flag information indicates ON, the coding method determination unit 102 determines a coding method such that a current picture references only one or more pictures temporally following the current picture when the current picture belongs to a frame temporally next preceding a P-picture and is to be coded as a B-picture.

By selecting reference pictures in this manner, the current pictures to be coded reference temporally close pictures in the case where the coding flag information indicates ON for the current picture to be coded. This increases accuracy of estimation of a motion vector in searching for a motion vector. The image coding device 100 according to Embodiment 1 thus achieves higher accuracy of estimation of a motion vector in searching for a motion vector without searching a larger range for a motion vector, and thereby increasing picture quality and coding efficiency.

The number of reference pictures may be reduced from three to two also in the case where a current picture to be coded belongs to a frame temporally next preceding a P-picture. For example, only the pictures P6 and P7 are selected as reference pictures for B4 and one range of each of the reference picture is set as a range to be searched for a motion vector.

As illustrated in (b) of FIG. 6, the coding method determination unit 102 selects the picture P6 as a reference picture of the picture B4 for the same reasons as in the case illustrated with (b) of FIG. 5, and sets a center of a range to be searched different from the center of the range to be searched determined in the coding method for a normal case.

In other words, a coding method is determined so that two ranges in the picture P6 are searched for motion vectors in the coding of the picture B4.

Similarly, a coding method is determined so that the picture P7 is selected as a reference picture of the picture B5 and two ranges in the picture P7 are searched for motion vectors.

The number of cycles predetermined for hardware is thereby effectively used to the full, and consequently accuracy of motion estimation and coding efficiency are further increased.

Next, the following describes an example of the second method of determining a coding method with reference to FIG. 7.

FIG. 7 specifically illustrates a coding method in which the number of successive frames to which pictures to be coded as B-pictures belong is set smaller when coding flag information indicates ON than when coding flag information indicates OFF.

This example assumes that a signal indicating the video camera is zooming or panning is provided as input image additional information on the coding flag generation unit 101. In this case, the number of successive frames to which pictures to be coded as B-pictures belong is set smaller than in the case of a normal coding until the signal indicating the video camera has stopped zooming or panning is provided to the coding flag generation unit 101.

In (a) and (b) of FIG. 7, a picture I0 is coded as an I-picture, a picture P1, a picture P4, and a picture P5 are each coded as a P-picture, and a picture B2, a picture B3, a picture B6, and a picture B7 are each coded as a B-picture. As in (a) of FIG. 5, these pictures are arranged in input order into the image coding device 100.

The arrows in the drawings represent the same as the arrows in (a) and (b) of FIG. 5.

For the second method of determining a coding method illustrated in FIG. 7, a coding method for a normal case is the same as the coding method illustrated in (a) of FIG. 5 or in (a) of FIG. 6.

In the second method, when the coding flag information indicates ON, the coding method determination unit 2 selects not the coding method for a normal case but a coding method for the flag-ON case as illustrated in FIG. 7.

More specifically, the coding method determination unit 102 determines a coding method such that the pictures B4 and B5 coded as B-pictures in the coding method for a normal case (B4 and B5 in (a) of FIG. 5 or in (a) of FIG. 6) are coded as P-pictures (P4 and P5 in FIG. 7) in the coding method for the flag-ON case.

As a result, the coding method determination unit 102 also determines a coding method in which pictures I0, P1, and P4 are selected as reference pictures of the picture B2, and pictures B2, P1, and P5 are selected as reference pictures of the picture B3.

Thus, in the coding method for the flag-ON case determined in the second method of determining a coding method, the number of successive frames to which pictures to be coded as B-pictures belong is reduced from two to one.

The image coding device 100 according to Embodiment 1 of the present invention thus shortens temporal distance between a current picture to be coded and a reference picture. In other words, accuracy of estimation of motion vectors in searching for motion vectors is increased without searching larger ranges.

In the case described above with reference to (a) of FIG. 5 to FIG. 7, the image coding device 100 codes a current picture as a B-picture. In addition, in the case where a current picture is to be coded as a P-picture, the image coding device 100 is also capable of increasing accuracy of estimation of motion vectors by selecting a picture close to the current picture to be coded.

(a) of FIG. 8 illustrates a coding method for a normal case (a coding method for "flag-OFF case") in the case where the current picture is to be coded as a P-picture.

(b) of FIG. 8 illustrates a coding method for "flag-ON case" in the case where the current picture is to be coded as a P-picture.

In (a) and (b) of FIG. 8, pictures I0 to B7 are field pictures and arranged in input order into the image coding device 100.

As illustrated in (a) of FIG. 8, the coding method determination unit 102 determines a coding method in which I0 is selected as a reference picture of P2 for a normal case.

On the other hand, as illustrated in (b) of FIG. 8, the coding method determination unit 102 determines a coding method in which I1, which belongs to the same frame as I0 and is closer to P2 than I0, is selected as a reference picture of P2 for the flag-ON case.

Thus, also in the case of coding a current picture to be coded as a P-picture, the image coding device 100 according to Embodiment 1 of the present invention increases accuracy of estimation of a motion vector in searching for a motion vector without searching a larger range.

In addition, in the case of coding of progressive pictures, the image coding device 100 is also capable of increasing accuracy of estimation of a motion vector by selecting a picture close to the current picture to be coded.

Figure 9:
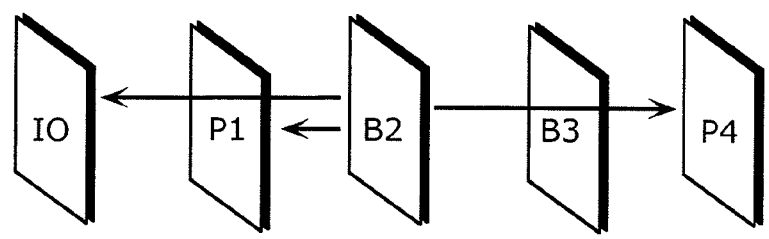
FIG. 9 illustrates a method of coding a progressive image. (a) illustrates a coding method for a normal case, and (b) for a flag-ON case.
Figure 9:
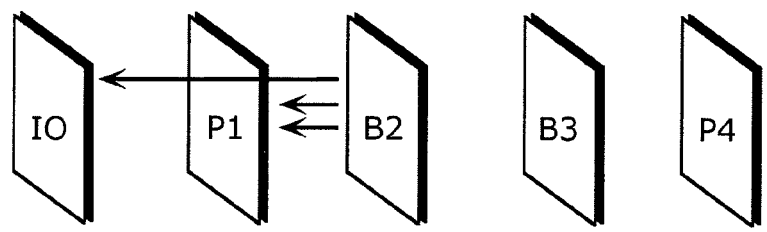

(a) of FIG. 9 illustrates a coding method for a normal case (a coding method for the flag-OFF case) in the case of coding of progressive pictures.

(b) of FIG. 9 illustrates a coding method for the flag-ON case in the case of coding of progressive pictures.

In (a) and (b) of FIG. 9, pictures I0 to P4 are frame pictures and arranged in input order into the image coding device 100.

As illustrated in (a) of FIG. 9, the coding method determination unit 102 determines a coding method in which I0, P1, and P4 are selected as reference pictures of B2 for the flag-OFF case.

On the other hand, as illustrated in (b) of FIG. 9, the coding method determination unit 102 determines a coding method in which P1, which is closer to B2 than P4 is, is selected as a reference picture of P2 for the flag-ON case.

In other words, as in the case of the coding method for the flag-ON case illustrated in (b) of FIG. 5, the coding method determination unit 102 avoids selecting a temporally far picture as a reference picture and sets two ranges to be searched in a closer picture P1.

To put it another way, (b) of FIG. 9 illustrates another example of the coding method for the case where the current picture belongs to a frame temporally next following a P-picture and is to be coded as a B-picture.

In coding of progressive pictures, in the case where a current picture to be coded belongs to a frame temporally next preceding a P-picture and is to be coded as a B-picture and the coding flag information indicates ON, the image coding device 100 determines a coding method such that only one or more pictures temporally following the current picture are referenced.

For example, in the case where B3 in (a) and (b) of FIG. 9 is to be coded, the coding method determination unit 102 determines a coding method in which only P4 is selected as a reference picture for "flag-ON case".

In coding of progressive pictures, the image coding device 100 may code so that the number of successive frames to which pictures to be coded as B-pictures belong is smaller when coding flag information indicates ON than when coding flag information indicates OFF as with the case of the second method described above.

For example, in (a) of FIG. 9, the coding method determination unit 10n determines a coding method such that B3 is selected from B-pictures (B2, B3) to be coded as a P-picture for the flag-ON case.

Then, B2 is next preceded and next followed by P-pictures, and not P4 but one or both of the two P-pictures next following and next preceding B2 are selected as a reference picture or reference pictures of B2.

As described above, the image coding device 100 according to Embodiment 1 of the present invention determines a coding method also for coding of progressive pictures so that a reference picture for the flag-ON case, that is, the case where the image coding device 100 codes input image data of a moving picture showing a motion of a predetermined motion amount or greater, such as a picture captured by zooming or panning of a camera, is closer to the current picture to be coded than a reference picture for the case of a coding for a normal case is.

The image coding device 100 thus increases accuracy of estimation of a motion vector in searching for a motion vector without searching a larger range for the motion vector.

Embodiment 2

Figure 10:
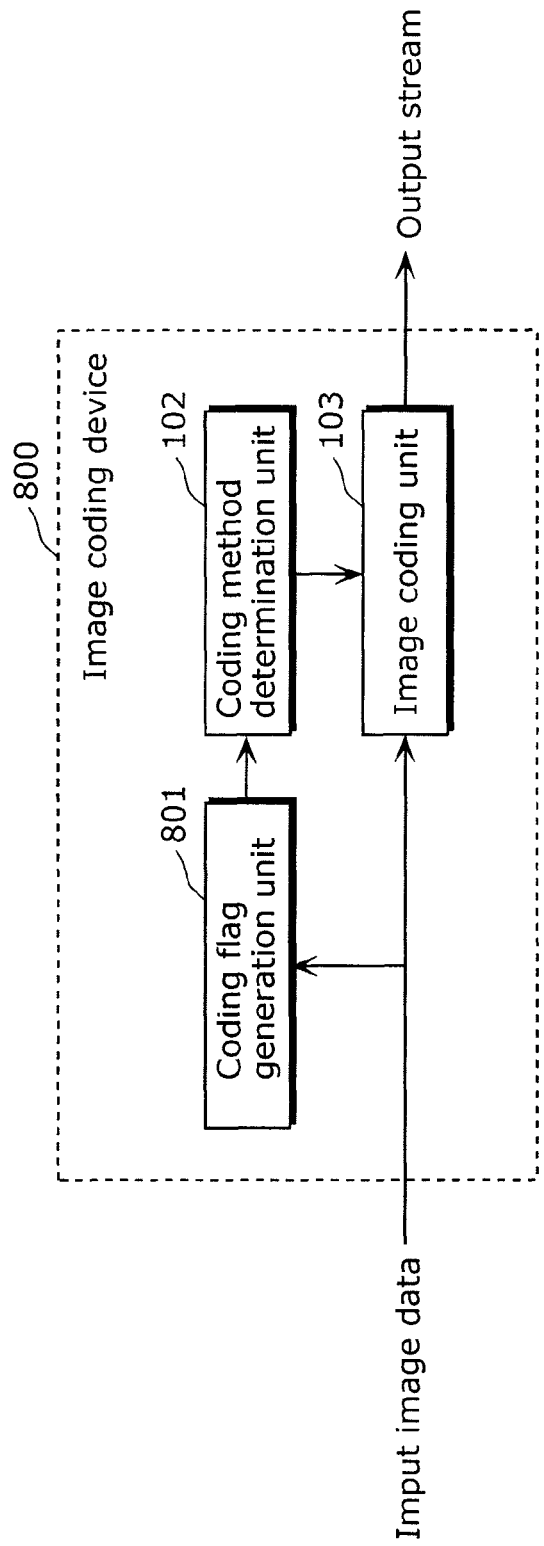
FIG. 10 is a block diagram which illustrates an image coding device according to Embodiment 2 of the present invention.

FIG. 10 is a block diagram which illustrates an image coding device 800 according to Embodiment 2 of the present invention.

As shown in FIG. 10, the image coding device 800 includes a coding flag generation unit 801, a coding method determination unit 102, and an image coding unit 103.

The coding flag generation unit 801 receives input image data and generates coding flag information based on properties of the received input image data, in other words, information inherent to the input image data. The coding flag generation unit 801 then provides the generated coding flag information to the coding method determination unit 102.

The coding method determination unit 102 and the image coding unit 103 are the same as those in Embodiment 1 of the present invention, and thus a detailed description thereof is omitted.

Embodiment 2 of the present invention is different from Embodiment 1 of the present invention only in a method of determination by the coding flag generation unit 801 as to whether or not input image data is included in data of a moving picture which shows a motion of a predetermined motion amount or greater. Coding of input image data in Embodiment 2 is performed in the same manner as in Embodiment 1 using a coding method based on determined coding method information provided from the coding method determination unit 102.

The following describes processing which is performed by the coding flag generation unit 801 of the image coding device 800 configured as described above.

First, input image data is provided to the image coding unit 103 and the coding flag generation unit 801. The coding flag generation unit 801 determines, based on information inherent to the provided input image data, whether or not input image data is included in data of a moving picture which shows a motion of a predetermined motion amount or greater using a method described below with reference to FIG. 11.

When determining that the input image data is image data included in data of a moving picture which shows a motion of the predetermined motion amount or greater, the coding flag generation unit 801 generates coding flag information which indicates ON. Otherwise, the coding flag generation unit 801 generates coding flag information which indicates OFF. The coding flag generation unit 801 then provides the generated coding flag information to the coding method determination unit 102.

Figure 11:
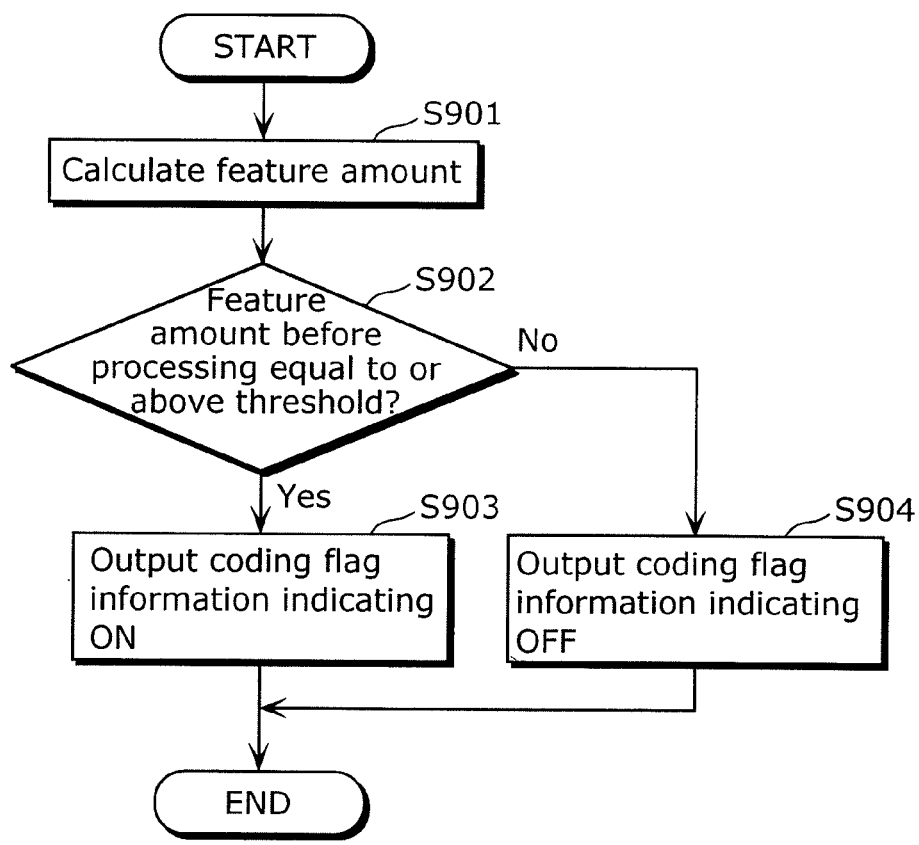
FIG. 11 is a flowchart which illustrates an example of processing performed by the coding flag generation unit of the image coding device according to Embodiment 2 of the present invention.

The following describes an example of the processing performed by the coding flag generation unit 801 FIG. 11.

FIG. 11 is a flowchart which illustrates an example of processing performed by the coding flag generation unit 801 of the image coding device 800 according to Embodiment 2 of the present invention.

As shown in FIG. 11, the coding flag generation unit 801 calculates a feature amount of the input image data (S901). The coding flag generation unit 801 determines whether or not the feature amount calculated in S901 is equal to or above a predetermined threshold (S902).

In other words, the coding flag generation unit 801 determines whether or not the feature amount of input image data to be coded is equal to or above a predetermined threshold.

When determining that the feature amount is equal to or above the predetermined threshold (Yes in S902), the coding flag generation unit 801 outputs coding flag information which indicates ON (S903).

When determining that the feature amount is below the predetermined threshold (No in S902), the coding flag generation unit 801 outputs coding flag information which indicates OFF (S904).

The feature amount calculated from the input image data is, for example, an absolute value of a difference between frames of input images. The feature amount may be, for example, a motion amount between the current input image and a preceding input image.

When the feature amount, which indicates difference between a current picture to be coded and, for example, a coded picture next preceding the current picture is above a threshold, these pictures are determined to be a series of pictures included in data of a moving picture which shows a large motion.

In this case, the coding flag generation unit 801 in Embodiment 2 determines that the current picture to be coded is included in a moving picture which shows a motion of the predetermined motion amount or greater.

When coding flag information indicating ON is generated through such a method of determination, a coding method determined by the coding method determination unit 102 is the same as in Embodiment 1.

In other words, as illustrated in (b) of FIG. 5, a close picture is selected as a reference picture in comparison with the normal case.

The image coding device 800 according to Embodiment 2 performs the processing described above to have the same advantageous effect as the image coding device 100 according to Embodiment 1.

Specifically, the image coding device 800 according to Embodiment 2 thus increases accuracy of estimation of a motion vector in searching for a motion vector without searching a larger range for the motion vector even in the case of coding a moving picture which shows a relatively great motion. That is, image quality and coding efficiency are thus increased.

Embodiment 3

Figure 12:
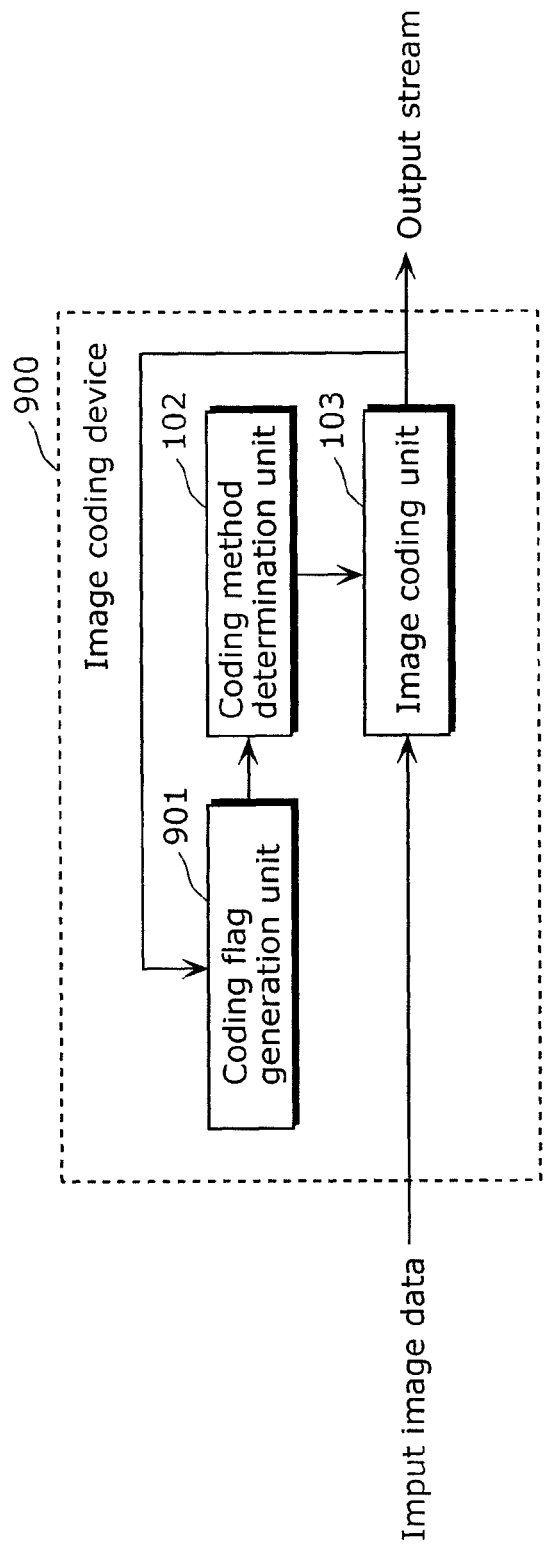
FIG. 12 is a block diagram which illustrates an image coding device according to Embodiment 3 of the present invention.

FIG. 12 is a block diagram which illustrates an image coding device 900 according to Embodiment 3 of the present invention.

As shown in FIG. 12, the image coding device 900 includes a coding flag generation unit 901, a coding method determination unit 102, and an image coding unit 103.

The coding flag generation unit 901 generates coding flag information by using picture coding information on a picture which was coded and generated before current input image data, that is, a current picture to be coded, is coded by the image coding unit 103 (hereinafter referred to as "preceding coded picture"). The coding flag generation unit 901 then provides the generated coding flag information to the coding method determination unit 102.

The coding method determination unit 102 and the image coding unit 103 are the same as those in Embodiment 1 of the present invention, and thus a detailed description thereof is omitted.

Embodiment 3 of the present invention is different from Embodiment 1 of the present invention only in a method of determination by the coding flag generation unit 901 as to whether or not input image data is included in data of a moving picture which shows a motion of a predetermined motion amount or greater. Coding of input image data in Embodiment 3 is performed in the same manner as in Embodiment 1 using a coding method based on determined coding method information provided from the coding method determination unit 102.

The following describes processing which is performed by the coding flag generation unit 901 of the image coding device 900 configured as described above.

First, input image data is provided to the image coding unit 103. As in Embodiment 1 and 2, the image coding unit 103 compression-codes, using the H.264 compression method, image data of a current picture to be coded according to the determined coding method information provided from the coding method determination unit 102 and outputs resulting coded data as an output stream.

In Embodiment 3, the image coding unit 103 also transmits the compression-coded data of the picture to the coding flag generation unit 901.

The coding flag generation unit 901 receives the compression-coded data of the input image transmitted from the image coding unit 103. The coding flag generation unit 901 then makes a determination, based on picture coding information included in the data, as to the input image data which is currently to be coded.

In other words, the coding flag generation unit 901 uses picture coding information on a preceding coded picture to determine whether or not the input image data may be image data included in data of a moving picture which shows a motion of a predetermined motion amount or greater. The method of determination is described later with reference to FIG. 13.

When determining that the input image data may be image data included in data of such a moving picture, the coding flag generation unit 901 generates coding flag information which indicates ON. Otherwise, the coding flag generation unit 901 generates coding flag information which indicates OFF. The coding flag generation unit 901 then provides the generated coding flag information to the coding method determination unit 102.

Figure 13:
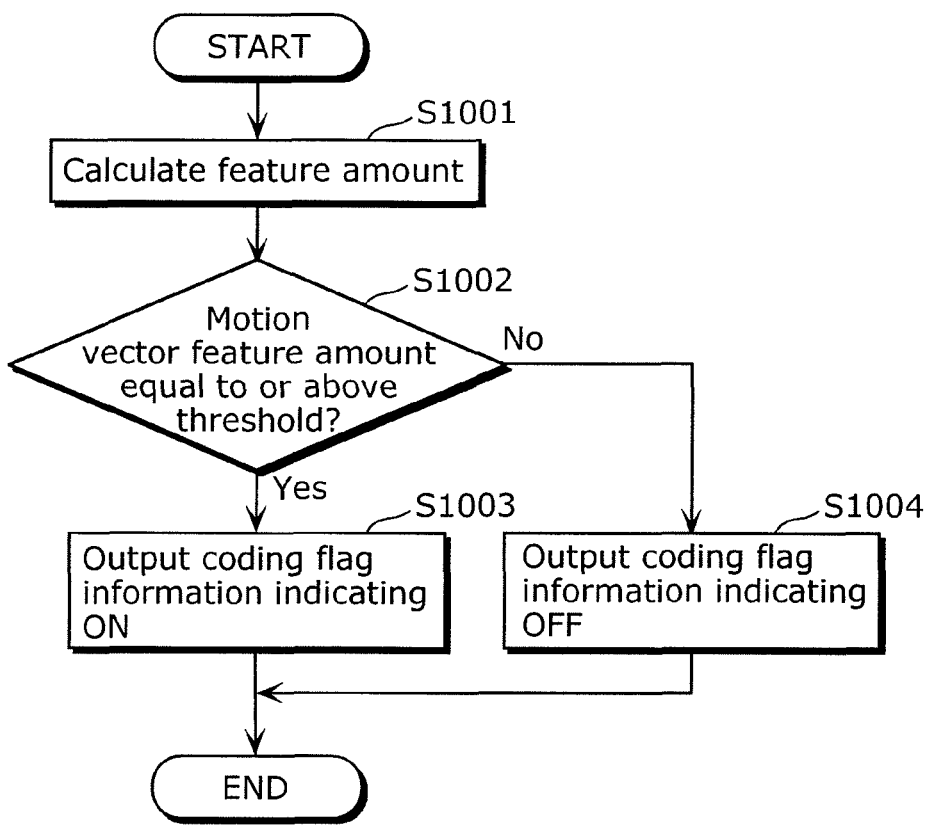
FIG. 13 is a flowchart which illustrates an example of processing performed by the coding flag generation unit of the image coding device according to Embodiment 3 of the present invention.

The following describes an example of the processing performed by the coding flag generation unit 901 with reference to FIG. 13.

FIG. 13 is a flowchart which illustrates an example of processing performed by the coding flag generation unit 901 of the image coding device 900 according to Embodiment 3 of the present invention.

In FIG. 13, the coding flag generation unit 901 first calculates a feature amount from picture coding information of the preceding coded picture transmitted from the image coding unit 103 (S1001).

The coding flag generation unit 901 calculates the feature amount by obtaining, for example, the sum of absolute values of motion vectors of respective macroblocks obtained from the picture coding information.

Next, the coding flag generation unit 901 determines whether or not the feature amount calculated in S1001 is equal to or above a predetermined threshold (S1002). When determining that the feature amount is equal to or above the predetermined threshold (Yes in S1002), the coding flag generation unit 901 provides coding flag information which indicates ON to the coding method determination unit 102 (S1003).

When determining that the feature amount is below the predetermined threshold (No in S1002), the coding flag generation unit 901 provides coding flag information which indicates OFF to the coding method determination unit 102 (S1004).

In Embodiment 3, the feature amount calculated by the coding flag generation unit 901 is assumed to be the sum of absolute values of motion vectors of respective macroblocks.

In other words, it is assumed that the picture coding method of the preceding coded picture obtained from the image coding unit 103 includes motion vectors of respective macroblocks.

It is to be noted that a feature amount may be calculated using a parameter other than motion vectors.

A feature amount may be a value other than the sum of absolute values of respective macroblocks, that is, the sum of absolute values of motion vectors belonging to one picture.

For example, the feature amount may be an average of motion vectors belonging to one picture. Alternatively, the feature amount may be an average of absolute values of motion vectors of belonging to the same picture or a variance of motion vectors of belonging to one picture. When coding flag information indicating ON is generated through such a method of determination, a coding method determined by the coding method determination unit 102 is the same as in Embodiment 1.

In other words, as illustrated in (b) of FIG. 5, a close picture is selected as a reference picture in comparison with the normal case.

The image coding device 900 according to Embodiment 3 performs the processing described above to have the same advantageous effect as the image coding device 100 according to Embodiment 1.

Specifically, the image coding device 900 according to Embodiment 3 thus increases accuracy of estimation of a motion vector in searching for a motion vector without searching a larger range for the motion vector even in the case of coding a moving picture which shows a relatively great motion. That is, image quality and coding efficiency are thus increased.

As described above, in the image coding devices 100, 800, and 900 according to Embodiments 1 to 3 of the present invention, the coding flag generation units 101, 801, and 901 generate coding flag information based on information, that is, input image additional information which is additional information on input image data, information inherent to input image data, and picture coding information on a picture coded before a current input image data and generated by the image coding unit 103, respectively, to provide the coding flag information to the coding method determination unit 102.

Receiving the coding flag information, the coding method determination unit 102 determines determined coding method information from the coding flag information and transmits the determined coding method information to the image coding unit 103.

Receiving the determined coding method information, the image coding unit 103 codes the input image data based on the determined coding method information and outputs a stream.

When the coding flag information, which indicates whether or not the input image data belongs to a moving picture showing a motion of a predetermined motion amount or greater, indicates ON, the image coding device 100, 800, and 900 with these configurations select, as a reference picture, a picture which is temporally close to the current picture to be coded.

Accuracy of estimation of a motion vector in searching for a motion vector is thus increased. Consequently, coding efficiency of input image data of a large motion is increased.

Furthermore, such image coding devices require a small amount of operations and a small circuit scale in comparison with the method in which coding efficiency is increased by searching a larger range for a motion vector. The image coding device according to the present invention thus achieves higher image quality and higher coding efficiency through a smaller amount of operations and smaller power consumption at a higher speed for an image coding method.

The three different methods, described in Embodiments 1 to 3, of determining whether or not input image data is included in data of a motion of a predetermined motion amount or greater of the present invention may be used in combination to make the determination.

The present invention is not limited to Embodiments 1 to 3 as described above.

For example, in Embodiment 1, the coding method determination unit 102 reduces the number of successive frames to be coded as B-pictures to one when the coding flag information indicates ON.

For example, after receiving coding flag information indicating ON, the coding method determination unit 102 may code each of the pictures to be coded not as a B-picture but as an I-picture or a P-picture until receiving coding flag information indicating OFF.

Furthermore, in Embodiment 1, the number of reference pictures in coding of a B-picture for a normal case is three. The present invention is not limited to this. For example, the number of reference pictures may be two or four.

Furthermore, in Embodiment 1, two ranges for searching for motion vectors are illustratively set for one reference picture when coding flag information indicates ON. The present invention is not limited to this. For example, such two ranges may be set for the picture closest to a current picture to be coded or for another reference picture to be coded.

Furthermore, in Embodiments 1 to 3, the H.264 compression method is used as an exemplary compression-code method. The present invention is not limited to this. For example, the MPEG-1, the MPEG-2, or the VC1 compression-code method may be used instead.

Thus, the image coding device according to the present invention determines whether or not input image data is image data included in data of a moving picture which shows a motion of a predetermined motion amount or greater, based on information such as input image additional information, input image data, or picture coding information on a picture coded before a current input image data generated by an image coding unit.

The image coding device according to the present invention further determines, based on the result of the determination above, a coding method such as a picture type of a current picture in coding and a reference picture of the current picture. Image quality and coding efficiency are thus increased.

Furthermore, image quality and coding efficiency are increased without searching a larger range for a motion vector. The image coding device thus needs a smaller circuit scale and consumes less power.

The present invention may be implemented not only as an image coding device including the processing units of Embodiments 1 o 3 of the present invention but also as a image coding method including operations of the processing units of the image coding device, an image coding integrated circuit including processing units of the image coding device, or an image coding program for implementing the image coding method.

The image coding program may be distributed via recording media such as a compact disc read-only memory (CD-ROM), and a communication network such as the Internet.

The image coding integrated circuit may be also implemented in the form of an LSI that is a typical integrated circuit. In this case, the LSI may be configured as one chip or as plural chips.

For example, functional blocks other than the memory may be integrated into a one-chip LSI. The integrated circuit described as an LSI above may be referred to as an IC, a system LSI, a super LSI or an ultra LSI depending on the degree of integration.

Figure 14:
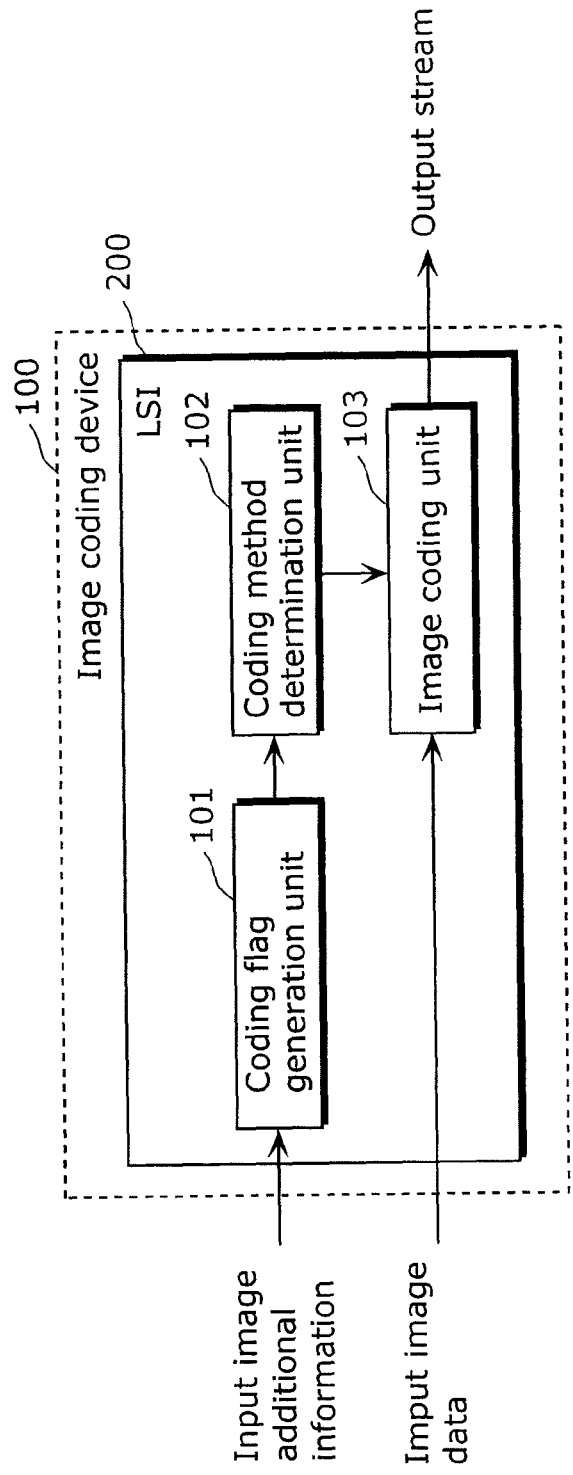
FIG. 14 is a block diagram which illustrates a configuration of an image coding integrated circuit according to the present invention.

FIG. 14 is a block diagram which illustrates a configuration of an image coding integrated circuit according to the present invention.

The image coding integrated circuit 200 illustrated in FIG. 14 is a one-chip LSI. FIG. 14 illustrates the case where the image coding device 100 according to Embodiment 1 is provided as the image coding integrated circuit 200. The image coding integrated circuit 200 may be provided as a multichip LSI.

The image coding device 800 according to Embodiment 2 and the image coding device 900 according to Embodiment 3 may be also provided as a one-chip LSI or a multichip LSI.

The method of forming integrated circuitry is not limited to use of an LSI. Dedicated circuitry or a general-purpose processor may be used instead of an LSI. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. The adaptation of biotechnology or the like is possible.

Furthermore, in implementation of an integrated circuit, a unit which stores data among the functional blocks may be separately provided rather than being included in a one-chip structure.

The image coding device and the image coding method according to the present invention perform image coding using a compression-coding method such as the H.264, the MPEG-1, the MPEG-2, and the VC1, with a smaller circuit scale and less power consumption. The present invention is thus applicable to personal computers, HDD recorders, DVD recorders, mobile phones with camera and so on.

The invention claimed is:

1. An image coding device, comprising:
a receiving unit configured to receive input image data;
a selection unit configured to select two or more reference pictures to be referenced by a current picture to be coded among pictures included in the received input image data, when the current picture is compression-coded using inter prediction;
a motion amount obtainment unit configured to obtain a motion amount of the current picture; and
a coding unit configured to perform the inter prediction by performing first prediction or second prediction selectively switched therebetween based on the obtained motion amount, the first prediction being an operation by which the inter prediction is performed based on a range set, as a range to be searched for a motion vector, for each of the selected two or more reference pictures, and the second prediction being an operation by which the inter prediction is performed based on a range set, as a range to be searched for a motion vector, for each of the selected two or more reference pictures other than a farthest reference picture that is a reference picture temporally most distant from the current picture among the two or more reference pictures.

2. The image coding device according to claim 1, wherein the coding unit is configured to set two or more ranges to be searched for motion vectors for at least one of the reference pictures other than the farthest reference picture.

3. The image coding device according to claim 1, wherein the coding unit is configured to perform the inter prediction by performing the first prediction or the second prediction selectively switched therebetween based on the obtained motion amount, the first prediction being an operation by which motion vectors are calculated based on m ranges set, as ranges to be searched for motion vectors, for the selected n reference pictures, and the second prediction being an operation by which motion vectors are calculated based on m ranges set, as ranges to be searched for motion vectors, for the n−1 reference pictures except the farthest reference picture that is a reference picture temporally most distant from the current picture among the selected n reference pictures, where n is an integer greater than or equal to 2 and m is an integer greater than or equal to 2.

* * * * *